US010248789B2

(12) United States Patent
Augustýn

(10) Patent No.: US 10,248,789 B2
(45) Date of Patent: Apr. 2, 2019

(54) FILE CLUSTERING USING FILTERS WORKING OVER FILE ATTRIBUTES

(71) Applicant: Avast Software s.r.o., Prague (CZ)

(72) Inventor: Michal Augustýn, Prague (CZ)

(73) Assignee: AVAST SOFTWARE S.R.O., Prague (CZ)

( * ) Notice: Subject to any disclaimer, the term of this patent is extended or adjusted under 35 U.S.C. 154(b) by 179 days.

(21) Appl. No.: 15/349,506

(22) Filed: Nov. 11, 2016

(65) Prior Publication Data

US 2017/0132413 A1 May 11, 2017

Related U.S. Application Data

(60) Provisional application No. 62/254,063, filed on Nov. 11, 2015.

(51) Int. Cl.
*G06F 21/56* (2013.01)
*G06F 17/30* (2006.01)

(52) U.S. Cl.
CPC ...... *G06F 21/565* (2013.01); *G06F 17/30091* (2013.01); *G06F 17/30126* (2013.01); *G06F 2221/034* (2013.01)

(58) Field of Classification Search
CPC ............. G06F 21/565; G06F 17/30091; G06F 17/30126

USPC .......................................................... 726/23
See application file for complete search history.

(56) References Cited

U.S. PATENT DOCUMENTS

| 7,930,747 | B2 * | 4/2011 | Durie ................... G06F 21/577 709/223 |
| 8,255,993 | B2 | 8/2012 | Cooley et al. |
| 8,719,939 | B2 * | 5/2014 | Krasser ................... G06F 21/56 726/24 |
| 2005/0256600 | A1 * | 11/2005 | Nakasugi ............... B82Y 10/00 700/100 |
| 2011/0040976 | A1 * | 2/2011 | Yairi ........................ G06F 1/14 713/178 |
| 2013/0117809 | A1 * | 5/2013 | McDougal .......... H04L 63/1408 726/1 |
| 2015/0244681 | A1 * | 8/2015 | Blumenfeld ........ H04L 63/0421 713/168 |

* cited by examiner

Primary Examiner — Michael S McNally
(74) Attorney, Agent, or Firm — Husch Blackwell LLP

(57) ABSTRACT

Systems and method classify a file using filters. A file event can be determined for the file. In response to the file event, metadata is received for the file. In response to receiving the metadata, a filter of a plurality of filters is selected based on the metadata. One or more rules in the selected filter can classify the file to determine an action to be performed with respect to the file.

27 Claims, 8 Drawing Sheets

METADATA TABLE

| METADATA | UPDATED | DESCRIPTION |
|---|---|---|
| FILE HASH | ONCE | UNIQUE IDENTIFIER |
| FILE STORAGE | ONCE | LOCATION WHERE FILE IS STORED |
| DIGITAL SIGNATURE | ONCE | SUBJECT, SIGNING DATE, MANUAL CATEGORIZATION |
| STATIC FILE INFO | ONCE | FILE SIZE, FILE TYPE ENTROPY, PE FILE CHARACTERISTICS, SECTIONS, IMPORTS |
| DYNAMIC FILE INFO | 1-10 TIMES | RESULTS OF INTERNAL ANALYZERS |
| SOURCES | FREQUENTLY | HOW FILE WAS RECEIVED, TIMESTAMP WHEN FILE WAS RECEIVED |
| UNPACKS | ONCE | WHAT WAS UNPACKED FROM FILE |
| ANTIVIRUS DETECTIONS | FREQUENTLY | DETECTED MALWARE (IF ANY) |
| MANUAL CATEGORY | 0-1 TIMES | CATEGORY ASSIGNED BY ANALYST (MALWARE, CLEAN) |

| Gen.file_type_class_asc.0 | StringEqualsIgnoreCase | "pe" |
| Classification.is_clean | NotEquals | "1" |
| Classification.is_damaged | NotEquals | "1" |
| SlotType.is_trojangen_pe | NotEquals | "1" |
| Whitelist.is_whitelisted | NotEquals | "1" |

704

| Sources.time | GreaterThan | "$last_month_timestamp" |
| Sources.type | StringEquals | "Avastheur" |
| Sources.reason | StringEquals | "Virus" |
| Sources.virus | StringEquals | "Win32:CPL [Susp]" |
| Sources.file_name | MatchesIgnoreCase | "[\.-](?=pdf|jpg|jpeg|xml|doc|mpeg)\.cpl" |

FIG. 7

FILE CLUSTERING USING FILTERS WORKING OVER FILE ATTRIBUTES

CROSS-REFERENCE TO RELATED APPLICATIONS

This application claims priority to U.S. Provisional Patent Application Ser. No. 62/254,063, filed on Nov. 11, 2015, to Michal Augustỳn, entitled FILE CLUSTERING USING FILTERS WORKING OVER FILE ATTRIBUTES, the entire disclosure of which is incorporated herein by reference.

FIELD

The disclosure relates generally to clustering files, and more particularly, to clustering files using filters that work over file attributes.

BACKGROUND

Malware, short for "malicious software," is software that can be used to disrupt computer operations, damage data, gather sensitive information, or gain access to private computer systems without the user's knowledge or consent. Examples of such malware include software viruses, trojan horses, rootkits, ransomware etc. A common mechanism used by malware developers is to embed the malware into a file that is made to appear desirable to user, or is downloaded and executed when the user visits a web site. For example, malware may be embedded into a software application that appears legitimate and useful. The user downloads the file, and when the file is opened, the malware within the file is executed. A file that contains malware can be referred to as a malicious file.

Malware in a file typically exhibits some kind of pattern or signature in the file. Detecting malware in files typically involves determining if the file contains a pattern or signature that is associated with malware. However, in order to detect malware, the signature or pattern of the malware must be determined. In the past, this was typically a manual process involving an analyst running a candidate program to determine if it exhibited malware behavior, and then determining what the signature or pattern of the malware is. However, the number of new files requiring analysis can number in the hundreds of thousands per day. As a result, it is no longer practical to manually analyze new files to determine signatures or patterns for new malware.

SUMMARY OF THE INVENTION

Systems and methods classify a file by determining a file event for a file. In response to the file event, metadata for an attribute of the file is received. In response to receiving the metadata, a filter of a plurality of filters is selected based at least in part on the metadata. One or more rules are executed in the selected filter to determine an action to be performed with respect to the file. In response to determining the action, the file is placed into a queue associated with the action. Further, the file event comprises one of a plurality of file events. The plurality of file events each have a priority and determining a file event for a file comprises determining the file event in an order based, at least in part, on the priority of the file event.

The queue containing the file may be assigned to a human analysist for further analysis. The selected filter may allow a human analyst to specify rules that can be understood by the human analyst without the need to know a computer programming language. A graphical user interface to define a specification indicative of the filter may be provided. The filter may be a filter that filters incoming undetected samples based on suspicious manifest permissions for a mobile operating system.

BRIEF DESCRIPTION OF THE DRAWINGS

For a better understanding of the inventive subject matter, reference may be made to the accompanying drawings in which:

FIG. 3 is a table of file metadata that is used in embodiments.

FIG. 5 is an example user interface screen for defining rules used by filters.

FIG. 7 illustrates an example subset of rules for a second filter.

DETAILED DESCRIPTION

Figure 1:
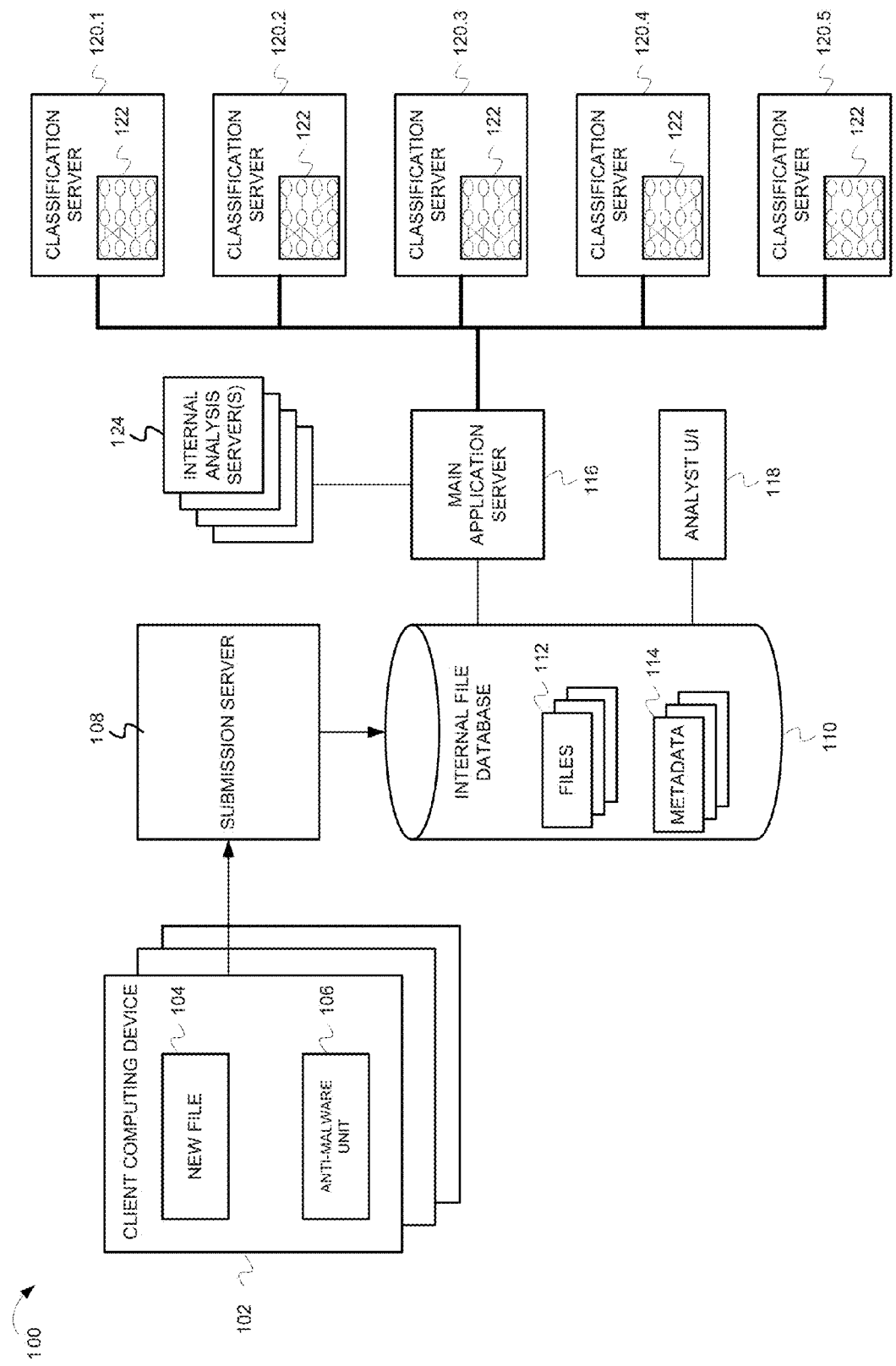
FIG. 1 is a block diagram of a system for classifying files using filters to cluster files according to file metadata.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

FIG. 1 is a block diagram of a system 100 for classifying files using filters to cluster files according to file metadata. In some embodiments, system 100 includes client computing device 102, submission server 108, internal file database 110, main application server 116, classification servers 120, internal analysis servers 124, and an analyst user interface (U/I) 118.

Client computing device 102 can be a desktop computer, laptop computer, tablet computer, smart phone, personal digital assistant, media player, set top box, or any other device having one or more processors and memory for executing computer programs. The embodiments are not limited to any particular type of computing device. Client computing device 102 can include an anti-malware unit 106. Anti-malware unit 106 can include one or more of software, firmware or other programmable logic that can detect malicious files. Additionally, anti-malware unit 106 can submit a new file 104 for analysis. The new file may be a file that has not been seen before by the anti-malware unit 106, or may have only been seen on a low number of systems (e.g., the file may be a day one malware source).

Client computing device 102 can submit new file 104 to submission server 108. Submission server 108 can perform preprocessing on the new file 104 and add the new file to a collection of files 112. In some aspects, the preprocessing can include "uniquization", i.e., determining that the file is not already included in the collection of files 112, creating initial file metadata 114 for the file. In some aspects, the source of the file (i.e., a URL and/or disk path) may be stored in the metadata 114 associated with the file.

Files from the collection of files 112 and metadata 114 associated with the files can be submitted to a main application server 116. Main application server 116 distributes files and metadata to a selected classification server 120 (e.g., classification servers 120.1-120.5) for classification. Main application server 116 may select a particular classification server based on load balancing and availability considerations. Main application server may also distribute files to one or more internal analysis servers 124 for analysis.

Classification server 120 receives a file and its associated metadata and classifies the file based on metadata associated with the file. In some aspects, the classification server 120 uses a classification network 122 to classify the file based on the file's metadata 114. During the classification process performed by a classification server 120, metadata 114 associated with a classified file may be updated with the result of the classification. As an example, the file may be classified as clean (i.e., free of malware), unknown (i.e., unknown whether the file contains malware or not), or it may be classified as containing a type of malware. Alternatively, the file may be classified as belonging to a cluster (i.e. group) of files that share certain characteristics and that require further analysis (perhaps manual analysis). The results of the classification may then be stored in internal file database 110.

Analyst U/I 118 provides a user interface for an analyst to create rules for use by filters in classification network 122. Further, analyst U/I 118 may include an interface for use in manually analyzing a file to classify the file.

Internal analysis servers 124 can perform static or dynamic analysis of a file. In some aspects, an internal analysis application can perform a static analysis of a file. For example, the file can be parsed in to components and the components in the file can be analyzed and/or the layout of the file can be stored in internal file database 110. For instance, a PE file can be parsed, and the layout (e.g., number of sections, names of imports etc.) can be stored in the internal file database 110. In other aspects, an internal analysis application can perform a dynamic analysis of the file. The file can be executed in a virtual environment (e.g., a sandbox) and the internal analysis application can observer what happens during the execution of the file (e.g., access to server(s), execution of other processes, writes to disk, writes to registry etc.). The internal analysis applications may analyze the file prior to, or subsequent to, classification by a classification server 120.

Further details on the operation of the above-describe system are provided below with reference to FIGS. 2-4.

Figure 2:
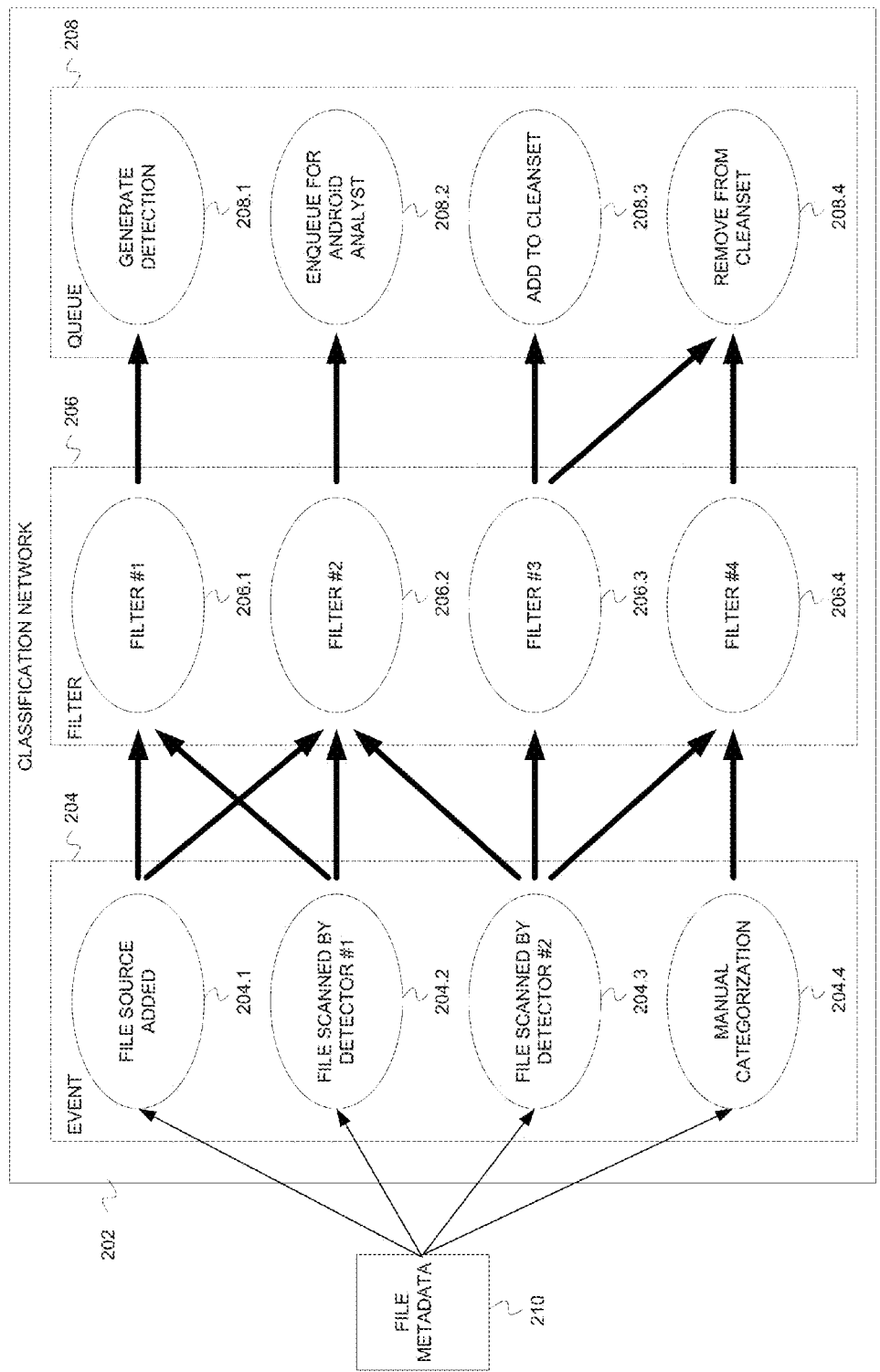
FIG. 2 is a block diagram illustrating a classification network according to embodiments.

FIG. 2 is a block diagram illustrating a classification network 122 according to embodiments. Classification network 122 can be a multilayer network of nodes that receives file metadata 210 and classifies a file associated with the file metadata 210. In some aspects, classification network 122 can be a neural network, and the nodes of the classification network can be neurons of the neural network. In the example illustrated in FIG. 2, classification network 122 includes three layers, an event layer 204, a filter layer 206 and a queue layer 208. The event layer 204 can be an input layer, with particular nodes in the input event layer 204 mapped to particular attributes of file metadata 210. One or more nodes in the event layer 204 may be activated when file metadata 210 is added or altered. The one or more nodes in the event layer 204 cause one or more nodes in the filter layer 206 to be activated. A node in the filter layer 206 comprises a filter node that can execute a user-defined algorithm to determine a result. The result of a filter node can cause one or more nodes in queue layer 208 to be activated. The result of a node in the queue layer 208 can be a final action to be taken after the node has been activated In the example illustrated in FIG. 2, node 204.1 in event layer 204 may be activated when metadata indicating the source of a file associated with the file metadata 210 is added or changed. Activation of node 204.1 can cause filter 206.1 and/or 206.2 in filter layer 206 to be activated. Node 204.2 in event layer 204 may be activated when metadata is associated with a file that indicates that the file was scanned using a first malware detector. For example, a node 204.2 may be activated when file metadata 210 is updated to indicate that the file was scanned using anti-malware software available from AVAST Software s.r.o. of Prague, Czech Republic. Node 204.2 may cause activation of filter 206.1 and/or filter 206.2 in filter layer 206. Node 204.3 in event layer 204 may be activated when metadata that is associated with a file indicates that the file was scanned using a second malware detector. For example, node 204.3 may be activated when file metadata 210 indicates that the file was scanned using the Yara malware identification tool. Node 204.3 may cause activation of filter 206.2, filter 206.3 and/or filter 206.5 in filter layer 206. Node 204.4 in event layer 204 may be activated when file metadata 210 indicates that a file has been manually categorized (e.g., categorized as containing a particular type of malware or categorized as clean). Node 204.4 may cause filter 206.5 in filter layer 206 to be activated.

In response to being activated, a filter in layer 204 can execute algorithms to determine an output for the filter. Depending on the output, one or more of the nodes in queue layer 208 may be activated. In some aspects, the algorithm executed by a filter in layer 204 can be a user-defined algorithm that uses some or all of the attributes in file metadata 210 to determine a result. The result can be a true/false value (i.e., the file matches the conditions of the filter). Alternatively, the result can be another type of value (e.g., a real number).

The result of a filter can then be passed to one or more connected queue nodes in queue layer 208 to activate the one or more of the queue nodes. For example, a queue node in layer 208 can be activated if the connected filter in layer 206 matched (returned true) or if the real number result crossed a defined threshold. In this case, the queue node can be activated and a final action can be taken. In some aspects, the final action can be adding the processed file to the queue which can later be consumed by analysts or automated tools. In other aspects, the action that can be taken can be generating a malware detection for the file.

In the example illustrated in FIG. 2, the output of filter 206.1 may determine whether node 208.1 is activated to cause the file to be placed on a queue of files that have malware detected in them. The output of filter 206.2 may determine whether node 208.2 is activated to cause the file is placed on a queue of files to be added to a queue of files to be analyzed by an analyst that specializes in malware that may exist in files executable in an Android OS software environment. The output of filter 206.3 may determine whether node 208.3 or node 208.4 is activated. Node 208.3 can cause the file to be added to a set of files known to be clean of malware. Node 208.4 can cause the file to be removed from the set of files known to be clean of malware. The output of filter 206.4 may determine whether node 208.4 is activated. As noted above, node 208.4 may cause a file to be removed from the set of files known to be clean of malware.

It is possible that an action taken by a queue node in queue layer 208 can be emitting or altering metadata for the file. In such a case, the added or altered data can cause a node in the event layer 204 to be activated. Thus, it is possible to introduce loops in the network. In the case that classification network 122 is a neural network, a recurrent neural network can be created. Thus, it is desirable to include conditions in filters that avoid infinite looping in the classification network 122.

The example illustrated in FIG. 2 shows a classification network 122 having four nodes in three layers. Those of skill in the art having the benefit of the disclosure will appreciate that a layer of classification network 122 may have fewer than four nodes or may have more than four nodes. Further, the number of nodes in each layer may be different from one another. Additionally, functions other than those described above for the nodes may be provided. All of these aspects are within the scope of the inventive subject matter.

FIG. 3 is a table 300 describing file metadata attributes that can be used in various embodiments. Column 320 provides the attribute label, column 330 provides the frequency that the attribute is typically updated during a file's life cycle, and column 340 provides a brief description of the attribute.

File hash 302 is typically determined once (e.g., when the file is added to internal database 110 (FIG. 1)). In some embodiments, file hash 302 is a SHA256 hash of the file. However, other types of file hashing algorithms are possible and within the scope of the inventive subject matter.

File storage 304 indicates where the file is stored in internal database 110.

Digital signature 306 can include a subject (i.e., the owner of the digital signature), signing date, a manual categorization of the file, or other data. If a manual categorization is included, then the categorization is replicated to files signed using the digital signature 306.

Static file information 308 provide information about the file that does not change. For example, the file size, file type, file entropy, portable executable (PE) file characteristics (sections, imports, exports etc.) may be included in static file information 308.

Dynamic information 310 includes the results of automatic internal analyzers (e.g., an application on an internal analysis server 124). When a file is submitted to internal database 110, it may be analyzed by one or more internal analysis applications in addition to classification by a classification server 120. As described above with respect to FIG. 1, the internal analysis applications may run on one or more internal analysis servers 124 to perform static or dynamic analysis of a file. The results of analysis by these applications can be included in dynamic information 310. Updates to the dynamic file information 310 can cause the file to be processed again by a classification server 120.

Sources 312 indicates how the file was received, and may also include a timestamp indicating when the file was received. The same file may be received from multiple sources (e.g., from multiple different client systems 102), and it may be received from different anti-malware software applications. Sources 312 can be used to indicate which anti-malware application was a source for the file.

Unpacks 314 indicates what file(s) were unpacked from a container file. A file may be an archive or compressed file (e.g., ".zip" file) that contains other files. The unpacks 314 attribute indicates what files were unpacked from a container file.

Antivirus detections 316 indicates whether malware was detected in the file. The can be multiple antivirus detections 316 attributes in the metadata, with one attribute assigned to each antimalware application.

Manual category 318 is a category that has been manually assigned as a result of a human analyst examining the file and determining if malware is present or if the file is clean (i.e., free of malware).

Those of skill in the art having the benefit of the disclosure will appreciate that file metadata may include other attributes that can be used in addition to, or instead of, the above described attributes. The use of such other attributes in the systems and methods herein is within the scope of the inventive subject matter.

Figure 4:
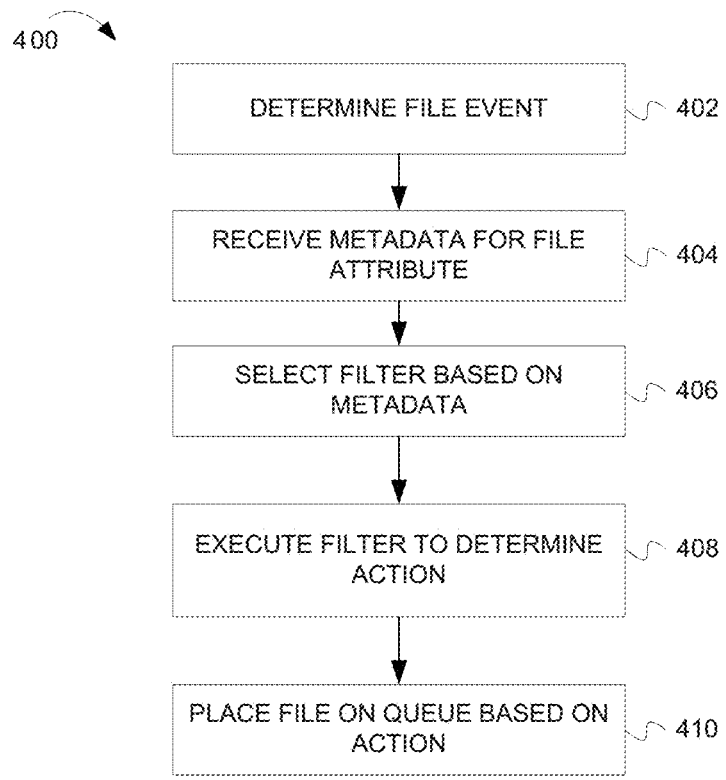
FIG. 4 is a flow chart illustrating operations of a method for classifying files using filters to cluster files according to file metadata.

FIG. 4 is a flow chart 400 illustrating operations of a method for classifying files using filters to cluster files according to file metadata.

At block 402, a file event is determined. An event can be the addition or update of a metadata attribute for a file. Additions and updates of the metadata can occur as the result of scanning the file (e.g., with antimalware software, or the above-described filters), internal analysis of the file, manual categorization, adding a file, unpacking a file etc. There can be millions of such events in a day, with some of the events configured to trigger filters. In some aspects, the events can be prioritized. For example, the events may be prioritized in the following order:

Manual categorization
File came from a new source
Scan finished
User triggered manual execution of filters
Digital signature was manually categorized
New detection based on this file was created
Metadata added Manual categorization is a result of a human action after an analysis. Because there may be a limited number of analysts, there may be just hundreds of these every day, and thus may be given a highest priority. For example, when an analyst marks a file as clean, it is desirable to move this file to a clean set as soon as possible. This can be also accomplished by a node in filter layer 206.

Receiving a file from a new source may also be an important event. Thus, an event may be triggered every time a file is received from a new source. This might mean that a new file was received in the wild that contains a malware threat that is to be automatically detected. Or conversely, information may be received that the file is definitely clean and detections are to be removed from it. Thus, in some embodiments, any detections that are active for a file may be disabled. Information about the disabling of the detection can be distributed to client application (e.g., via streaming updates) so that the client programs will no longer consider the file to contain malware. These action can therefore reduce false positives in client programs. For the above reasons, receiving a file from a new source can be given a high priority.

At block 404, one or more metadata attributes are determined based on the event. For example, when a file is received, metadata indicating the source of the file may be read.

At block 406, a filter is selected based on the event and the metadata. As noted above, a filter is an algorithm that may analyze a file and/or file metadata and produce a result. In some aspects, a filter may be implemented in a typical programming language such as C, C#, Java etc. However, in alternative aspects, a filter may be implemented using a rules grammar that allows an analyst to specify rules that can be understood by analysts that do not know a conventional programming language. The rules can be a conjunction of terms having the following format:

METADATA_ATTRIBUTE_OPERATOR_VALUE where metadata_attribute is an attribute of the metadata (e.g., an attribute described above with respect to FIG. 2). An example of such an attribute is Scans.detection_count_avast9 and the whole term can be as follows:

Scans.detection_count_avast9 Equals "0"

where "Scans" is a container (i.e., a structure) of attributes that are the result of running a scanning engine of an anti-malware product, and where "detection_count_avast9" is an attribute in the container that represents the number of detections that are active on the file when it was scanned using the Avast9 product available from AVAST Software s.r.o. Metadata attributes may appear in other containers. For example, a "Sources" container may have attributes related to the sources of a file. DigitalSignatures can be a container with attributed related to digital signatures associated with a file. Whitelist can be a container that has attributes related to whether the file is on a white list, and/or which white list the file appears on.

In some embodiments, an operator can be one of the following: Equals, NotEquals, LessThan, GreaterThan, LessThanOrEquals, GreaterThanOrEquals, StringEquals, StringEqualsIgnoreCase, NotStringEquals, NotStringEqualsIgnoreCase, Contains, NotContains, ContainsIgnoreCase, NotContainsIgnoreCase, Matches, MatchesIgnoreCase, NotMatches, NotMatchesIgnoreCase, Defined, NotDefined, Value. Additionally, operators can be used to create groups of terms and specify operations on top of these groups. Such operations include: All (all terms must be true), Any (at least one term must be true), None (none of the tetras should be true). Those of skill in the art having the benefit of the disclosure will appreciate that other operators are possible and within the scope of the inventive subject matter.

A filter can thus be a group of terms connected with an AND operator. Another property of the filter definition language can be the ability to connect several terms into groups with specific rules (e.g. all items in a group must match, at least one item must match, none of the items must match, etc.).

In some aspects, analyst U/I 118 can be used to provide a graphical user interface to define a filter specification. The graphical user interface can be helpful because analysts are not forced to learn a new description language. The graphical user interface can be an interactive web based interface that can include features such as text completion to aid in the specification of a filter. An example user interface screen is provided in FIG. 5.

At block 408, the selected filter is executed. That is, the code or the rules in the filter are applied to a file and file metadata to determine an action (e.g., determine a queue node at queue layer 108).

At block 410, the file can be placed on a queue based on the action determined at block 408. In general terms, two types of actions are performed, file clustering and detection generation.

File Clustering

An analyst usually wants to work with a cluster of files that is defined by a set of features. These features can typically be described by filter rules. Thus, the filters and queues may be defined that describe various kinds of sample types. Queue results can be assigned to an analyst that performs further processing. This further processing might mean going through the list of files in a queue and manually analyzing them as well as pushing the files to another automatic analysis tool.

Figure 6:
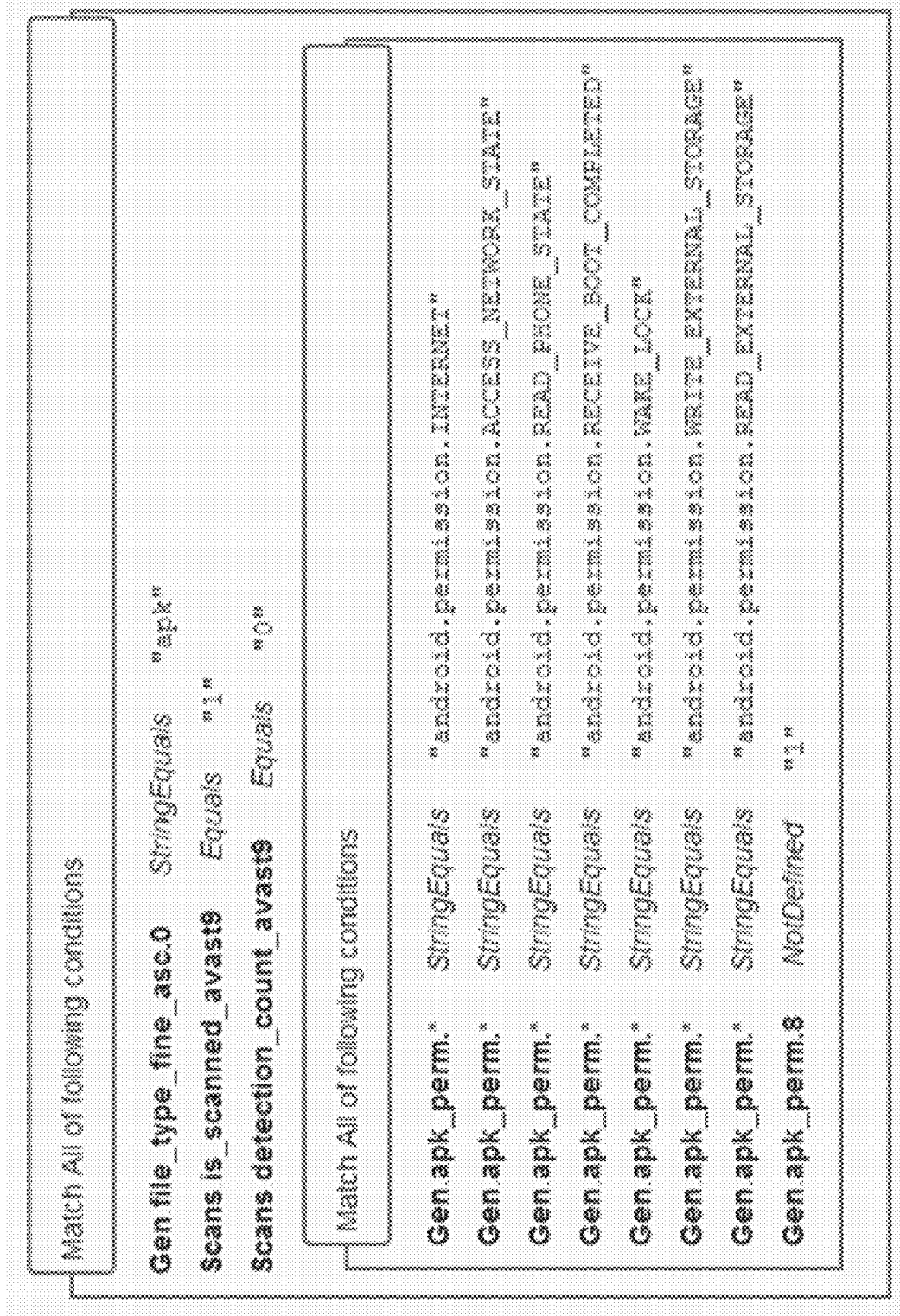
FIG. 6 illustrates an example subset of rules for a first filter.

An example of such filter might be an Android sample filter and a queue that filters incoming undetected samples based on suspicious Android manifest permissions. FIG. 6 illustrates an example subset of rules for such a filter. With respect to the conditions specified in the figure, the container "Gen" can be a container having attributes that result from a static analysis of the file such as file size, file type etc. The container "apk_perm" can include attributes related to a list of permissions that the application needs to work correctly. For example, on an Android phone, these permission can be the one the user is granting when installing a new application (e.g., access to Contact List, access to photos on the phone, etc.). As illustrated in FIG. 6, wild card characters (e.g., the "*" character) can be used to indicate that the any value is a match. In the example illustrated in FIG. 6, the "apk_perm" structure can be access via an index into the list of permissions. The use of the "*" character indicates that the index value doesn't matter (i.e., any index value is considered a match to the "*" character).

Detection Generation

A detection generating filter can be specified by setting the output of a filter to a special queue. For files in this queue, a checksum based detection can be automatically be generated in a short time.

An example portion of a filter that can cause a detection to be automatically generated detections is illustrated in FIG. 7. This example filter targets control panel ("CPL") files that may be submitted via internal analysis. Files from the submitted files can be selected that have specific characteristics that usually describes malware. The filter can be quite complex but the first set of rules, illustrated in FIG. 7 as portion 702, shows a basic filtering. In particular, the filter 702 selects PE files that were not categorized as clean, are not damaged or whitelisted.

The rest of the filter can be several groups of rules similar to the portion 704 shown in FIG. 7. By this fragment, files are selected from the last month that have been submitted via an "AvastHeur" feed where the filename matches the specified regular expression.

It is possible that a filter that performs automatic detection generation can generate false positives, especially if the filter terms are too loose and the selection of files contains files that are not to be detected as malware. Thus, some embodiments are capable of automatically dealing with false positives in addition to the generated detections described above.

For example, in some aspects, when a detection is disabled for any reason, a check is made to determine whether that detection was generated by a filter using relations stored in a table in the internal file database 110). If so, the detection and the filter are disabled. A disabled filter is not able to generate new detections until it is manually fixed and enabled again.

Re-Evaluation of Files

It should be noted that if the definition of a filter is changed, only new events (and their files) that trigger the changed filter execution will be affected (i.e., files that are run through the filter with the new definition). All files that ran based on previous matches are unaffected.

Thus, there is a possibility that with a filter being changed, some files that were previously matched will not be matched anymore. Therefore, in some embodiments, a group of files can be submitted for reevaluation. In such a reevaluation, the changed filter can be scheduled to execute for files that were processed prior to the filter change.

Figure 8:
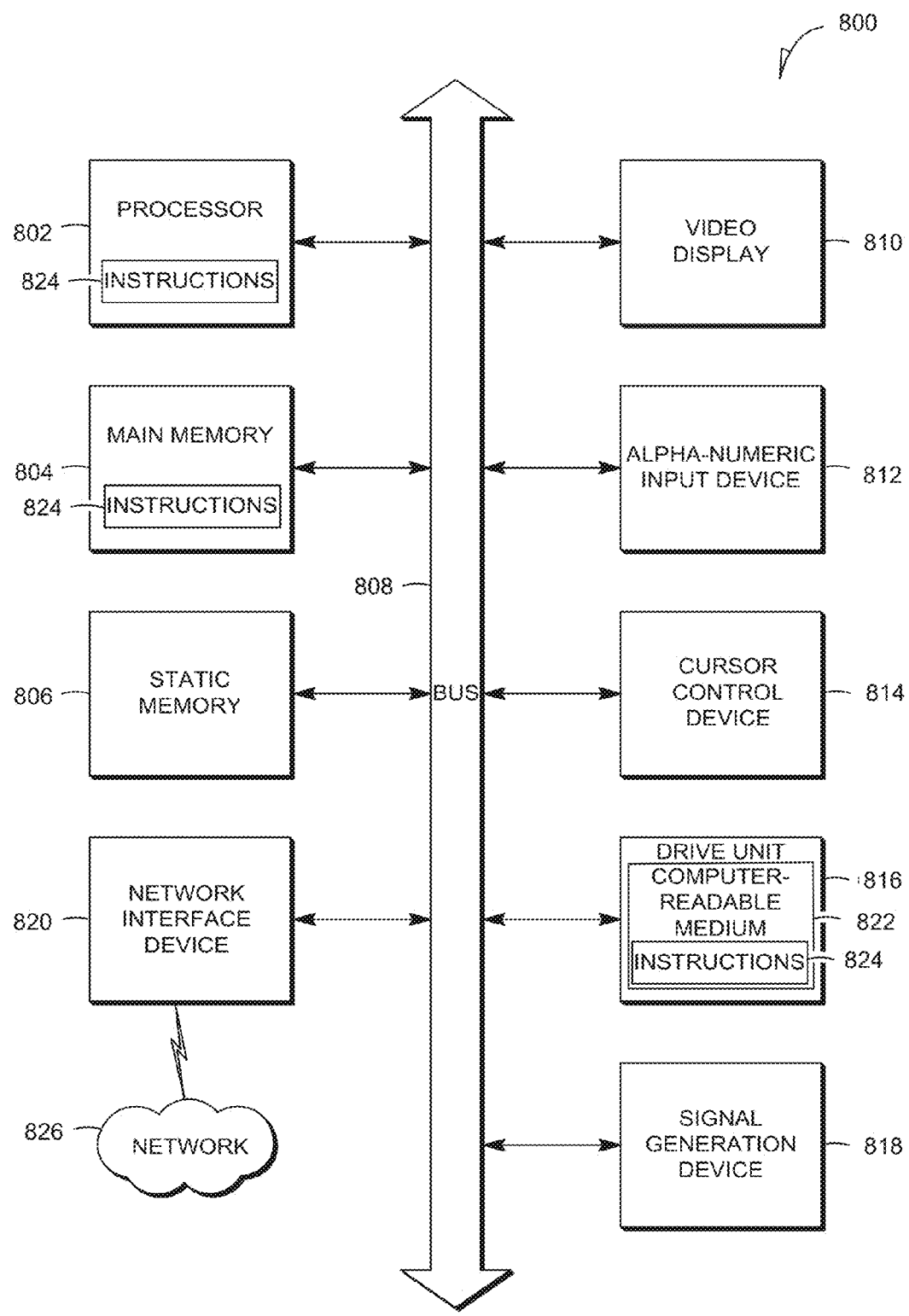
FIG. 8 is a block diagram of an example embodiment of a computer system upon which embodiments of the inventive subject matter can execute.

FIG. 8 is a block diagram of an example embodiment of a computer system 800 upon which embodiments of the inventive subject matter can execute. The description of FIG. 8 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 8 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 8, an example embodiment extends to a machine in the example form of a computer system 800 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 800 may include a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). In example embodiments, the computer system 800 also includes one or more of an alpha-numeric input device 812 (e.g., a keyboard), a user interface (UI) navigation device or cursor control device 814 (e.g., a mouse), a disk drive unit 816, a signal generation device 818 (e.g., a speaker), and a network interface device 820.

The disk drive unit 816 includes a machine-readable medium 822 on which is stored one or more sets of instructions 824 and data structures (e.g., software instructions) embodying or used by any one or more of the methodologies or functions described herein. The instructions 824 may also reside, completely or at least partially, within the main memory 804 or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 824 may further be transmitted or received over a communications network 826 using a signal transmission medium via the network interface device 820 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for classifying a file, the method comprising:
    determining a file event for a file;
    in response to the file event, receiving metadata for an attribute of the file;
    in response to receiving the metadata, selecting, based at least in part on the metadata, a filter of a plurality of filters, the plurality of filters comprising a filter layer of a classification network;
    executing one or more rules in the selected filter to classify the file as belonging to a cluster of files based on the metadata satisfying the executing one or more rules, the cluster of files sharing one or more metadata characteristics; and
    in response to classifying the file, activating, based at least in part on the classification, a queue node of a plurality of queue nodes for taking an action to be performed with respect to the file, the plurality of queue nodes comprising a queue layer of the classification network.

2. The method of claim 1, further comprising:
    in response to activating the queue node for taking the action, placing the file into the activated queue associated with the action.

3. The method of claim 1, wherein the file event comprises one of a plurality of file events, wherein the plurality of file events each have a priority, and wherein determining a file event for a file comprises determining the file event in an order based, at least in part, on the priority of the file event.

4. The method of claim 1, wherein said file event comprises an addition or an update of a metadata attribute for the file.

5. The method of claim 4, wherein the file event occur as the result of at least one of scanning the file, performing an internal analysis of the file, manually categorizing the file, and unpacking the file.

6. The method of claim 1, wherein the file event comprises a manual categorization of the file as a result of an action by a human after an analysis of the file by the human.

7. The method of claim 1, wherein the file is received from a source that comprises a new source.

8. The method of claim 7, wherein the file contains a malware threat.

9. The method of claim 7, said method further comprising:
    receiving information indicating that the file comprises a clean file that does not contain a malware and further receiving information indicative of a malware threat having been detected for the file; and
    removing the information indicative of the malware threat.

10. The method of claim 9, said method further comprising distributing to a client application information indicating that the information indicative of the malware threat has been removed from the file so that a client program will no longer consider the file to contain malware.

11. The method of claim 1, wherein said selecting a filter comprises selecting a filter that comprises an algorithm that analyzes at least one of the file and the metadata and produces a result.

12. The method of claim 1, wherein said selecting a filter comprises selecting a filter that allows a human analyst to specify rules that can be understood by the human analyst without the need to know a computer programming language.

13. The method of claim 12, wherein said rules comprise a conjunction of terms comprising an attribute of the metadata, an operator, and a value.

14. The method of claim 13, wherein the attribute of the metadata comprises a container of attributes that are a result of running an anti-malware scanning engine.

15. The method of claim 14, wherein the attribute of the metadata further comprises information indicative of a number of detections that are active on the file when it was scanned with the anti-malware scanning engine, wherein a detection is indicative of malware being present in the file.

16. The method of claim 13, wherein the attribute of the metadata comprises a container of attributes that indicative of sources of the file.

17. The method of claim 13, wherein the attribute of the metadata comprises a container of attributes that are indicative of digital signatures associated with the file.

18. The method of claim 1 further comprising providing a graphical user interface to define a specification indicative of said filter.

19. The method of claim 1, said method further comprising:
placing the file into the activated queue associated with the action; and
assigning the queue to a human analyst for further analysis.

20. The method of claim 19, wherein the filter filters incoming undetected samples based on suspicious manifest permissions for a mobile operating system.

21. An apparatus comprising:
a non-transitory computer readable storage medium comprising a set of instructions executable by a computer for classifying a file by:
determining a file event for a file;
in response to the file event, receiving metadata for an attribute of the file;
in response to receiving the metadata, selecting, based at least in part on the metadata, a filter of a plurality of filters, the plurality of filters comprising a filter layer of a classification network;
executing one or more rules in the selected filter to classify the file as belonging to a cluster of files based on the metadata satisfying the executing one or more rules, the cluster of files sharing one or more metadata characteristics; and
in response to classifying the file, activating, based at least in part on the classification, a queue node of a plurality of queue nodes for taking an action to be performed with respect to the file, the plurality of queue nodes comprising a queue layer of the classification network.

22. The apparatus of claim 21, the set of instructions executable by the computer for classifying the file further by, in response to determining the action, placing the file into the activated queue associated with the action.

23. The apparatus of claim 21, wherein the file event comprises one of a plurality of file events, wherein the plurality of file events each have a priority, and wherein said determining a file event for a file comprises determining the file event in an order based, at least in part, on the priority of the file event.

24. The apparatus of claim 21, wherein said selecting a filter comprises selecting a filter that uses rules that allows a human analyst to specify rules that can be understood by the human analyst without the need to know a computer programming language.

25. The apparatus of claim 21, the set of instructions executable by the computer for classifying the file further by providing a graphical user interface to define a specification indicative of said filter.

26. The apparatus of claim 21, the set of instructions executable by the computer for classifying the file by:
placing the file into the activated queue associated with the action; and
assigning the queue to a human analyst for further analysis.

27. The apparatus of claim 26, wherein the filter filters incoming undetected samples based on suspicious manifest permissions for a mobile operating system.

* * * * *